(12) United States Patent  
Sekiguchi et al.

(10) Patent No.: US 9,277,270 B2
(45) Date of Patent: Mar. 1, 2016

(54) IMAGE PROCESSING APPARATUS CAPABLE OF EXTRACTING FRAME IMAGE DATA FROM VIDEO DATA AND METHOD FOR CONTROLLING THE SAME

(75) Inventors: Youhei Sekiguchi, Kawasaki (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 13/039,754

(22) Filed: Mar. 3, 2011

(65) Prior Publication Data
US 2011/0216243 A1 Sep. 8, 2011

(30) Foreign Application Priority Data

Mar. 5, 2010 (JP) ................................. 2010-049316

(51) Int. Cl.
*H04N 7/00* (2011.01)
*H04N 21/435* (2011.01)
*H04N 21/2343* (2011.01)
*H04N 21/235* (2011.01)
*H04N 21/462* (2011.01)
*H04N 21/4728* (2011.01)

(52) U.S. Cl.
CPC ........... *H04N 21/435* (2013.01); *H04N 21/235* (2013.01); *H04N 21/234327* (2013.01); *H04N 21/4621* (2013.01); *H04N 21/4728* (2013.01)

(58) Field of Classification Search
CPC .......... H04N 5/23232; H04N 5/23235; H04N 5/23245; H04N 7/26361; H04N 7/26776; H04N 7/465; H04N 19/006; H04N 19/00757; H04N 19/00248; H04N 21/4728; G06T 3/4007

USPC .............................................. 348/36, 39, 581
See application file for complete search history.

(56) References Cited

U.S. PATENT DOCUMENTS 8,294,805 B2 * 10/2012 Kita .......................... 348/333.02
2010/0074341 A1 * 3/2010 Wan et al. ................ 375/240.26

FOREIGN PATENT DOCUMENTS

| JP | 2003-061043 A | 2/2003 |
| JP | 2003-333568 A | 11/2003 |
| WO | 2006/108917 A1 | 10/2006 |
| WO | 2010/023580 A1 | 3/2010 |

OTHER PUBLICATIONS

XP031170600; Mavlankar et al.; "Region-of-Interest Prediction for Interactively Streaming Regions of High Resolution Video"; Information Systems L,ahoratory, Stanford University, Stanford.
XP030006791; Schwarz et al. "Overview of the Scalable Extension of the H.264/MPEG-4 AVC Video Coding Standard".

* cited by examiner

*Primary Examiner* — Christopher S Kelley
*Assistant Examiner* — Christopher Findley
(74) *Attorney, Agent, or Firm* — Canon U.S.A., Inc. IP Division

(57) ABSTRACT

An image processing apparatus includes an acquisition unit configured to acquire information about field of view associated with a plurality of video data, and an extraction unit configured to extract, from video data with a wide field of view which includes an area indicated by information about the field of view of the video data displayed in timing at which an instruction for setting frame video data extracted from video data is input and is associated with the information about the field of view indicating an area wider than the area among the plurality of the video data, the frame image data corresponding to the timing.

14 Claims, 11 Drawing Sheets

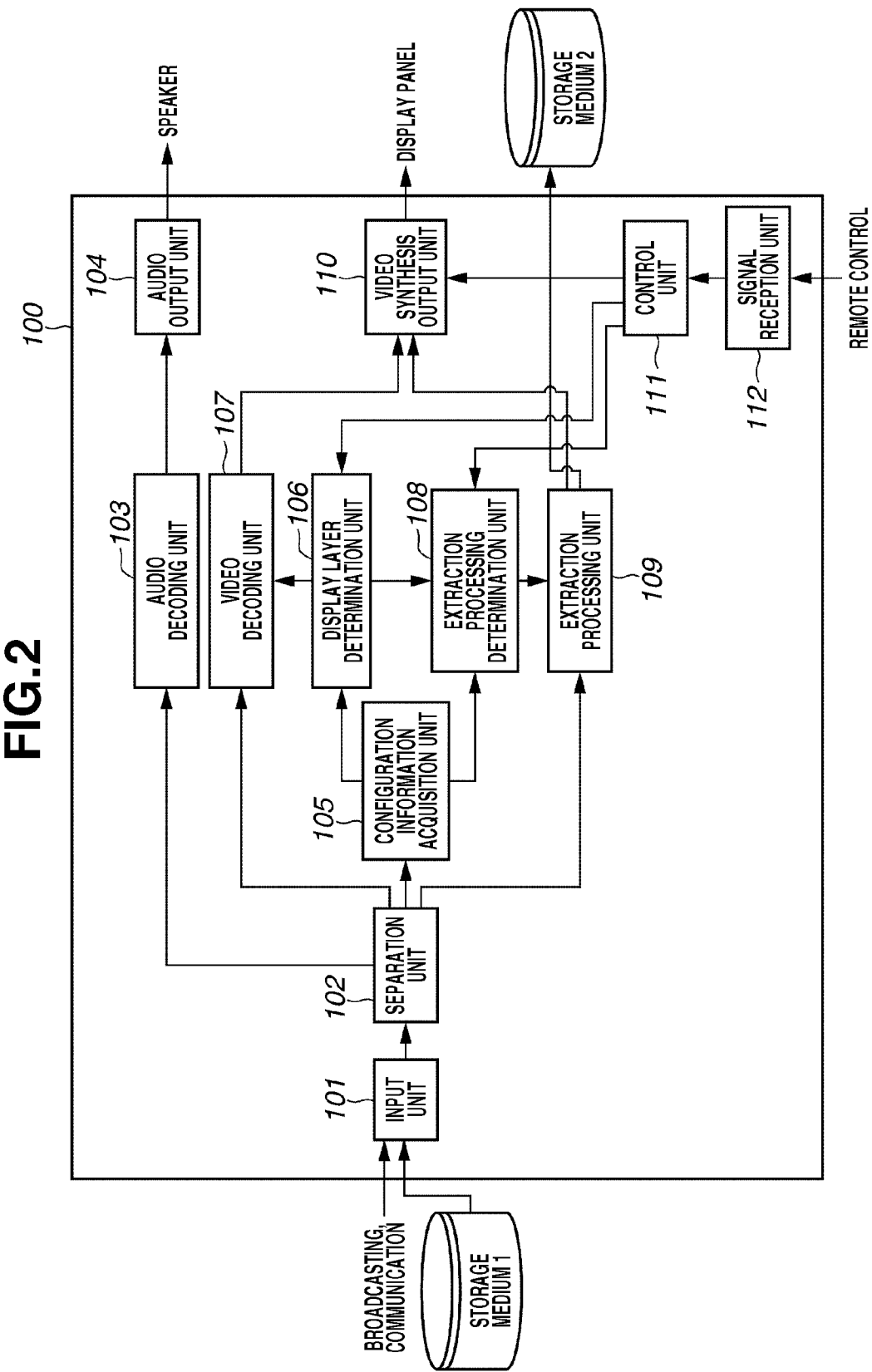

FIG.4A

|  | THE NUMBER OF PIXELS | FIELD OF VIEW (UPPER LEFT, LOWER RIGHT) | REFERENCE LAYER |
|---|---|---|---|
| LAYER A1 | 960×540 | (0,0), (960,540) | NONE |
| LAYER A2 | 1920×1080 | (0,0), (960,540) | LAYER A1 |
| LAYER A3 | 3840×2160 | (0,0), (960,540) | LAYER A2 |

FIG.4B

|  | THE NUMBER OF PIXELS | FIELD OF VIEW (UPPER LEFT, LOWER RIGHT) | REFERENCE LAYER |
|---|---|---|---|
| LAYER B1 | 960×540 | (0,0), (960,540) | NONE |
| LAYER B2 | 1920×1080 | (-480,-270), (1440,810) | LAYER B1 |
| LAYER B3 | 3840×2160 | (-480,-270), (1440,810) | LAYER B2 |

FIG.4C

|  | THE NUMBER OF PIXELS | FIELD OF VIEW (UPPER LEFT, LOWER RIGHT) | REFERENCE LAYER |
|---|---|---|---|
| LAYER C1 | 960×540 | (0,0), (960,540) | NONE |
| LAYER C2 | 1920×1080 | (0,0), (960,540) | LAYER C1 |
| LAYER C3 | 1920×1080 | (240,135), (720,405) | LAYER C2 |

FIG.6

| REPRODUCTION VIDEO DATA | DISPLAY LAYER | EXTRACTION LAYER | REPRESENTATIVE IMAGE | ADDED IMAGE |
|---|---|---|---|---|
| ENCODED VIDEO DATA A | LAYER A1 | LAYER A3 | LAYER A3 | — |
| | LAYER A2 | LAYER A3 | LAYER A3 | — |
| | LAYER A3 | LAYER A3 | LAYER A3 | — |
| ENCODED VIDEO DATA B | LAYER B1 | LAYER B1, LAYER B3 | LAYER B1 | LAYER B3 |
| | LAYER B2 | LAYER B1, LAYER B3 | LAYER B3 | LAYER B1 |
| | LAYER B3 | LAYER B1, LAYER B3 | LAYER B3 | LAYER B1 |
| ENCODED VIDEO DATA C | LAYER C1 | LAYER C2, LAYER C3 | LAYER C2 | LAYER C3 |
| | LAYER C2 | LAYER C2, LAYER C3 | LAYER C2 | LAYER C3 |
| | LAYER C3 | LAYER C2, LAYER C3 | LAYER C3 | LAYER C2 |

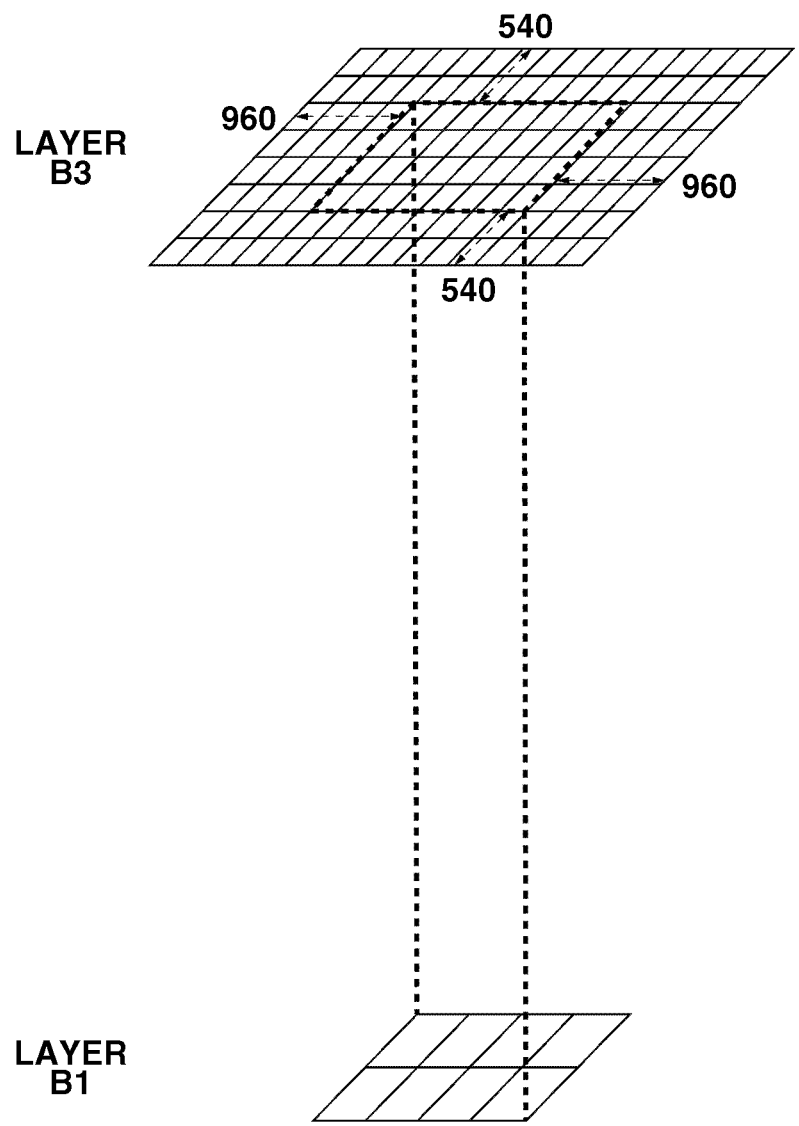

FIG.9

| REPRODUCTION VIDEO DATA | DISPLAY LAYER | EXTRACTION LAYER | REPRESENTATIVE IMAGE | IMAGE INFORMATION ADDITION GROUP | ADDED IMAGE |
|---|---|---|---|---|---|
| ENCODED VIDEO DATA A | LAYER A1 | LAYER A3 | LAYER A3 | — | — |
| | LAYER A2 | LAYER A3 | LAYER A3 | — | — |
| | LAYER A3 | LAYER A3 | LAYER A3 | — | — |
| ENCODED VIDEO DATA B | LAYER B1 | LAYER B3 | LAYER B3 (PORTION FOR FIELD OF VIEW OF GROUP BX) | GROUP BX | — |
| | LAYER B2 | LAYER B3 | LAYER B3 | GROUP BX | — |
| | LAYER B3 | LAYER B3 | LAYER B3 | GROUP BX | — |
| ENCODED VIDEO DATA C | LAYER C1 | LAYER C2, LAYER C3 | LAYER C2 | — | LAYER C3 |
| | LAYER C2 | LAYER C2, LAYER C3 | LAYER C2 | — | LAYER C3 |
| | LAYER C3 | LAYER C2, LAYER C3 | LAYER C3 | — | LAYER C2 |

IMAGE PROCESSING APPARATUS CAPABLE OF EXTRACTING FRAME IMAGE DATA FROM VIDEO DATA AND METHOD FOR CONTROLLING THE SAME

BACKGROUND OF THE INVENTION

1. Field of the Invention

The present invention relates to an image processing apparatus capable of extracting frame image data from video data and a method for controlling the same.

2. Description of the Related Art

Now, video data is variously used. For example, video data is displayed on a display unit by normally reproducing them, or frame image data is extracted from video data at any timing and image data to be displayed on a display unit or printed is generated from the extracted frame image data.

Japanese Patent Application Laid-Open No. 2003-333568 discusses a technique in which a low-resolution moving image is generated from a high-resolution moving image, and when clipping of a still image is instructed while the generated low-resolution moving image is viewed, the still image is clipped from the high-resolution moving image at a specified timing.

Recently, however, a plurality of video data different in field of view has been distributed. The field of view refers to the field of video data. The term field of view is also similarly used as expression corresponding to a field in computer graphics or animations, which are not image captured by a camera. For this reason, video large in field of view or video wide in field of view refer to video in which a wide area is captured or represented.

Suppose that, in a football (soccer) match, for example, there are two video images capturing the whole football stadium and only one football player in a football ground, which is a part of the whole football stadium. In this case, the video capturing the whole football stadium is the one that is wide in field of view and, on the other hand, the video capturing only one football player included in the video area wide in field of view is one that is narrow in field of view.

The video that is wide in field of view and the video that is narrow in field of view can be simultaneously distributed in parallel. Such a plurality videos can be different not only in field of view but also in the number of pixels in a frame image composing the video.

A case is assumed where frame image data is extracted from video data in situations where a plurality of videos different in field of view exists. A user displays the image data corresponding to any one field of view among a plurality of kinds of field of view, and gives an instruction about the extraction of a necessary frame image data while the video data is being displayed.

At this point, the frame image data extracted from the video data with another field of view which is not displayed by the user may be preferable for the user than the frame image data extracted from the displayed video data, which is the video data displayed by the user.

Suppose that, for example, there are two kinds of video data with a wide field of view capturing the whole football stadium and with a narrow field of view capturing one football player corresponding to a part of the field of view (area) in the video data. Furthermore, suppose that the video data with a narrow field of view is greater in the number of pixels per frame image and higher in pixel density than video data with a wide field of view.

If the technique discussed in Japanese Patent Application Laid-Open No. 2003-333568 is applied for the extraction of frame image data while the user displays video data with a narrow field of view, the frame image data is extracted from the image data which is greater in the number of pixels and higher in pixel density, i.e., from high-resolution video data with a narrow field of view than video data with a wide field of view.

Though the area not captured in the displayed video data with a narrow field of view is included in the video data with a wide field of view, which is not displayed, the user cannot acquire image data of the video data with a wide field of view. This is because the technique discussed in Japanese Patent Application Laid-Open No. 2003-333568 does not assume that the video data different in field of view exist.

Another case is considered in which the user extracts the frame image while displaying the video data small in the number of pixels in a case where there exists the video data that is great in the number of pixels per frame image and the video data that is small in the number of pixels among the video data with the same field of view to each other.

In this case, it is more desirable for the user to extract the frame image data from the video data that is great in the number of pixels, which is not displayed, rather than from the displayed video data. This is because the frame image data extracted from the video data that is great in the number of pixels is higher in fineness and, therefore, suited for the display and print of the image data, which offers the advantage that extends options for the process and print of the image data.

SUMMARY OF THE INVENTION

The present invention is directed to an image processing apparatus and a method for controlling the same capable of improving user-friendliness by extracting the frame image data from video data which is equal to or wider in field of view and greater in the number of pixels than the displayed video data viewed by a user using information about field of view and the number of pixels of the displayed video data and about field of view and the number of pixels of the video data not displayed in extracting the frame image data from those video data in a case where a plurality of video data different in at least one of field of view and the number of pixels exists.

According to an aspect of the present invention, an image processing apparatus capable of extracting frame image data from video data, wherein the video data is associated with information about the field of view of the video data, and a plurality of the video data includes video data different in information about field of view from the video data, the image processing apparatus includes an acquisition unit configured to acquire the information about field of view associated with the plurality of the video data, and an extraction unit configured to extract based on the information about the field of view acquired by the acquisition unit, from video data with a wide field of view, which includes an area indicated by information about the field of view of the video data displayed in timing at which an instruction for specifying frame video data to be extracted from video data is input, and are associated with the information about the field of view indicating an area wider than the area among the plurality of the video data, the frame image data corresponding to the timing.

According to an aspect of the present invention, the frame image data is extracted from video data which is wider in field of view and greater in the number of pixels than the displayed video data viewed by the user in extracting the frame image data from the video data in a case where a plurality of video data different in at least one of field of view and the number of pixels exists, thereby allowing user-friendliness to be improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a configuration of an image processing apparatus 100.

FIG. 4A is a table illustrating configuration information of the encoded video data A.

FIG. 4B is a table illustrating configuration information of the encoded video data B.

FIG. 4C is a table illustrating configuration information of the encoded video data C.

FIG. 6 illustrates layers for video data from which frame image data is extracted as representative and added images according to the first exemplary embodiment of the present invention.

FIG. 8 is a schematic diagram illustrating an example in which information about field of view of video data of a group to be added to frame image data is converted into a coordinate system based on the number of pixels of video data as reference, from which the frame image data is extracted according to the second exemplary embodiment of the present invention.

FIG. 9 is a table illustrates layers for video data from which representative image is extracted, groups having information about field of view of video data added to the extracted frame image data, and layers for video data from which added image is extracted according to the second exemplary embodiment of the present invention.

DESCRIPTION OF THE EMBODIMENTS

Various exemplary embodiments, features, and aspects of the invention will be described in detail below with reference to the drawings.

The video data processed in the image processing apparatus of the present exemplary embodiment is MPEG2 transport stream (TS) format stream-data. Video data and audio data are multiplexed onto the MPEG2 TS format stream-data. The video data is encoded video data in which a plurality of video data different in field of view and/or the number of pixels from one another is hierarchically encoded by H.264/SVC standard.

The hierarchically encoded video data has a structure for holding encoded stream data in a plurality of layers corresponding to a plurality of video data. The field of view refers to an area for an object held in an effective pixel area of video data. Video large in field of view or video with a wide field of view refers to video in which a wide area is held.

A plurality of video data acquired by decoding the hierarchically encoded video data is video data generated from the same video data. For example, a plurality of videos in a partial area generated by clipping a part of a video from the video with the widest field of view is generated, and the generated plurality of videos is encoded as the encoded video data.

Figure 1A:
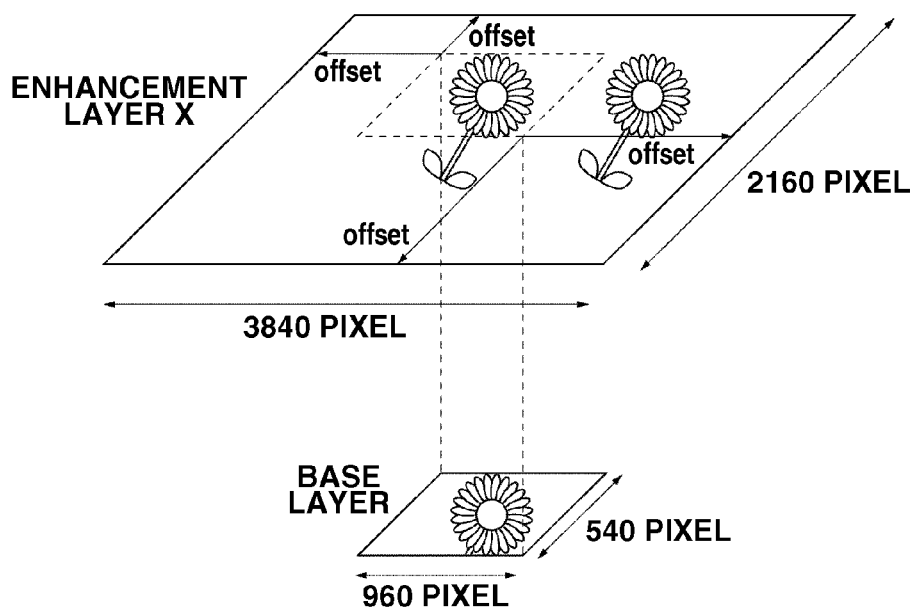
FIG. 1A is a relationship diagram of frame image data composing video data.
Figure 1B:
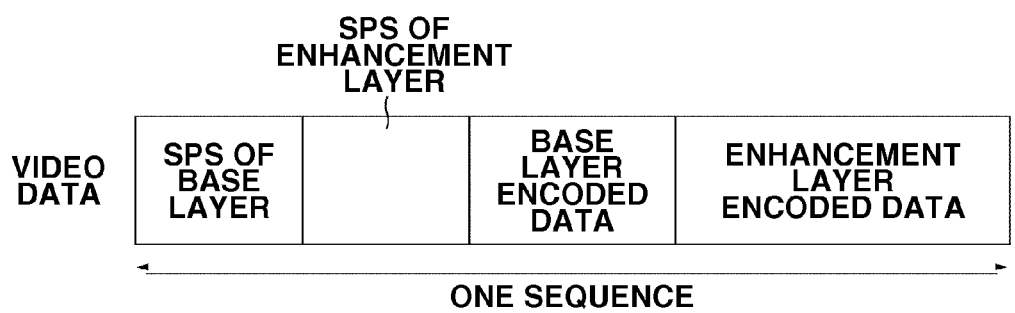
FIG. 1B is a schematic diagram illustrating data structure of H.264/SVC.

FIGS. 1A and 1B are schematic diagrams illustrating a configuration of the video data encoded by H.264/SVC. FIG. 1A is a relationship diagram of frame image data composing the encoded video data. FIG. 1B is a schematic diagram illustrating the data structure of H.264/SVC.

The plurality of video data is encoded correspondingly with a plurality of layers. The lowest layer in the plurality of layers is referred to as a base layer. An upper layer over the base layer is referred to as an enhancement layer. FIG. 1A illustrates encoded video data in which one enhancement layer exists with respect to one base layer.

One or more enhancement layers may be provided. The base layer holds data in which video used as a base in encoding a plurality of video data is encoded. The enhancement layer holds data in which video data of a difference between video data to be encoded and video data encoded in the base layer are encoded. The base layer, at this point, is referred to as a reference layer in the specification.

For the sake of simplifying the description in FIG. 1A, a layer, which is a unit for holding encoded data, is allocated to an image before a frame image is encoded or after a frame image is decoded.

Specifically, an enhancement layer X holds data in which difference data between 3840×2160 pixel video data and 960×540 pixel video data encoded in the base layer is encoded. For this reason, the 3840×2160 pixel video data can be obtained by decoding the encoded data in the enhancement layer X and the base layer, which is the reference layer.

The video data obtained by decoding the data in the enhancement layer X and the base layer is hereinafter referred to as video data of the enhancement layer X for the sake of convenience.

In the H.264/SVC standard, the video data encoded in the upper layer among a plurality of layers is higher than the video data in the lower layer in resolution (the number of pixels per unit area of the frame image data composing the video data). A plurality of enhancement layers can be provided. The upper enhancement layer holds data in which difference data between the base layer and the lower enhancement layer is encoded.

The data structure of the H.264/SVC standard is described with reference to FIG. 1B. The video data hierarchically encoded by the H.264/SVC standard include video encoded data themselves and a sequence parameter set (SPS) for holding information about the encoding of the whole sequence as a header. The number of the video encoded data and the SPS is equal to that of the layers.

The video encoded data is the data in which a plurality of video data composed of a set of a plurality of frame image data is encoded. The video encoded data in the base layer is the data in which frame image data composing video data in the base layer is encoded.

The video encoded data in the enhancement layer is the data in which a difference between the frame image data composing video data in the enhancement layer and the frame image data composing video data in the reference layer to which the enhancement layer refers is encoded.

The SPS is a header including information about encoding in each layer. The SPS in the base layer includes information related to the encoding of the whole sequence such as a profile, level, and an encoded mode of the whole sequence as is the case with H.264/AVC. The SPS in the enhancement layer stores information for encoding the difference between the video data in the enhancement layer and the video data in the reference layer to which the enhancement layer refers.

More specifically, the SPS in each layer includes information about the number of pixels per frame image data composing the video data in each layer (hereinafter abbreviated as information about the number of pixels of video data) and reference hierarchy information about a reference layer to which each layer refers.

The SPS further includes offset information representing the difference in the upper left and lower right end-point positions between the frame image data composing the video data in the enhancement layer and the frame image data composing the video data in the reference layer by a coordinate system with the number of pixels of the video data in the reference layer as a reference. The offset information may be stored in a slice header.

FIG. 2 is a block diagram illustrating a configuration of an image processing apparatus 100 according to a first exemplary embodiment.

In the image processing apparatus 100, MPEG2 TS stream data is input into an input unit 101 from broadcasting, communication, and a storage medium 1, and output to a separation unit 102. The separation unit 102 separates video and audio data from stream data, and outputs the audio data to an audio decoding unit 103 and the video data to a configuration information acquisition unit 105, a video decoding unit 107, and an extraction processing unit 109.

The audio decoding unit 103 decodes the input audio data, and outputs the decoded audio data to an audio output unit 104. The audio output unit 104 outputs the input audio data to a speaker.

The configuration information acquisition unit 105 acquires configuration information composed of information about the number of pixels and field of view of a plurality of video data obtained by decoding the input encoded video data, and information about the reference layer. The information about the number of pixels of each video data and information about the reference layer are acquired from the SPS or the slice header of the layer corresponding to each video data.

The information about field of view of each video data represents the upper left and lower right end-point positions indicating the field of view of each video data by a coordinate system with the number of pixels of the video data in the base layer as a reference. The coordinate system is a plane coordinate system with one pixel of the video data as one unit. For example, if the number of pixels of the video data is 1920×1080 pixels, the upper left and lower right end-point positions are (0, 0) and (1920, 1080) respectively.

Information about the field of view of each video data is a value in which the offset information of each video data is converted into a coordinate system with the number of pixels of the video data in the base layer as a reference. A positional relationship of the field of view of video data in the enhancement layer with video data in the base layer can be identified from the information about the field of view of each video data.

A display layer determination unit 106 determines a layer with the configuration information of video data to be displayed as a display layer. The video data to be displayed is determined by the selection of the user. The video decoding unit 107 generates the video data to be displayed by decoding encoding data in the display layer determined by the display layer determination unit 106 and a layer under the display layer. The video decoding unit 107 outputs the generated video data to a video synthesis output unit 110.

An extraction processing determination unit 108 determines a layer in which video data from which frame image data is extracted is encoded, based on the configuration information about all layers included in the encoded video data and about the display layer determined by the display layer determination unit 106. Hereinafter, the layer in which video data from which frame image data is extracted is encoded is referred to as an extraction layer.

The processing for determining the extraction layer is described in detail below. The extraction processing unit 109 extracts the frame image data in timing at which an instruction for the designation of the frame image data to be extracted is input, from the video data in the extraction layer determined by the extraction processing determination unit 108.

The extracted frame image data is output to the video synthesis output unit 110 and a storage medium 2 as storage data. The storage medium 2 may be similar to the above storage medium 1 and, more specifically, is a Digital Versatile Disc (DVD), Blue-ray Disc (BD), Hard Disk Drive (HDD), or memory card.

The video synthesis output unit 110 synthesizes the decoded video data and the extracted frame image data with graphics data output from a control unit 111, and outputs the synthesized data to a display panel. The control unit 111 generates graphics data such as a menu to be presented to the user according to a user's instruction input from the a signal reception unit 112 and an internal state in the image processing apparatus 100, and outputs the graphics data to the video synthesis output unit 110.

The control unit 111 performs control for displaying the data output to the display panel by the video synthesis output unit 110 on the display panel. The control unit 111 outputs a user's instruction for the reproduction of a video and the extraction of a frame image to the display layer determination unit 106 and the extraction processing determination unit 108, respectively. The signal reception unit 112 receives input from the user and outputs it to the control unit 111.

An example of a processing for acquiring the configuration information in the layer composing encoded video data, which is executed in the configuration information acquisition unit 105, is described below with reference to FIGS. 3A to 3C and FIGS. 4A to 4C.

Figure 3A:
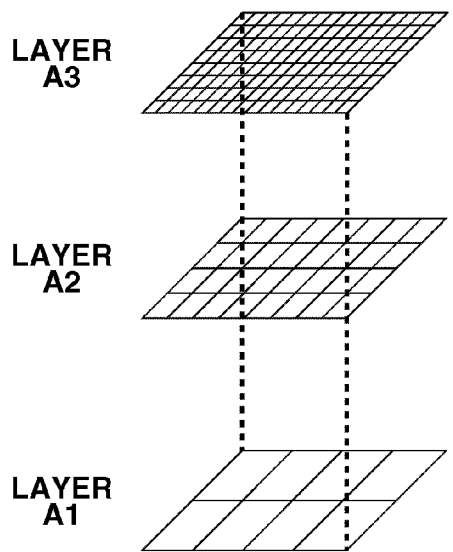
FIG. 3A is a schematic diagram of a layer composing an encoded video data A.
Figure 3B:
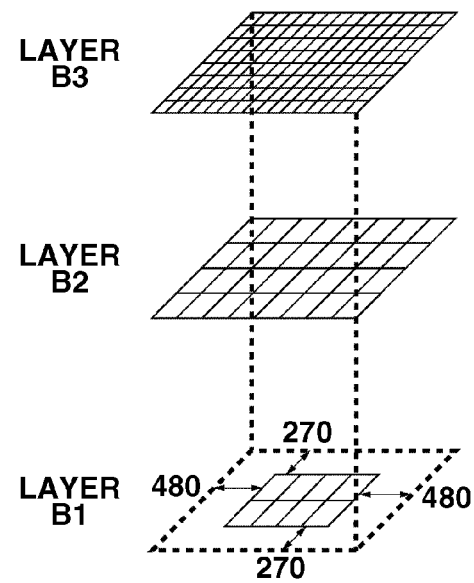
FIG. 3B is a schematic diagram of a layer composing an encoded video data B.
Figure 3C:
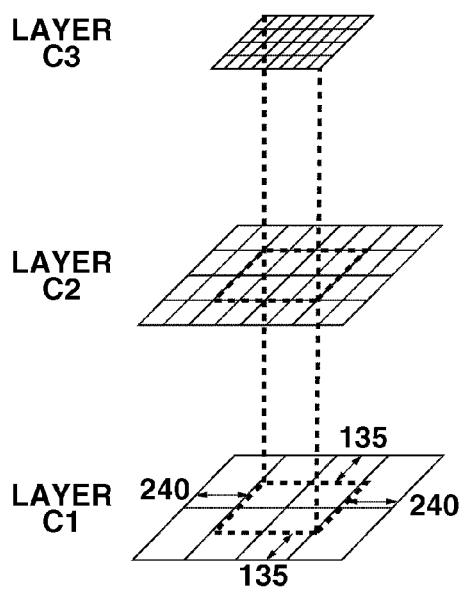
FIG. 3C is a schematic diagram of a layer composing an encoded video data C.

FIGS. 3A to 3C are schematic diagrams illustrating layers forming three kinds of encoded video data A, B, and C, respectively.

The encoded video data A is the one in which tree kinds of video data corresponding to the layers A1, A2, and A3 are hierarchically encoded. The encoded video data B is the one in which tree kinds of video data corresponding to the layers B1, B2, and B3 are hierarchically encoded. The encoded video data C is the one in which tree kinds of video data corresponding to the layers C1, C2, and C3 are hierarchically encoded.

Each of the encoded video data A, B, and C has one base layer and two enhancement layers. The size of a parallelogram in the schematic diagram indicates the size of field of view of each decoded video data. The fineness of a lattice in the parallelogram indicates the number of pixels of the video data.

FIGS. 4A to 4C illustrate configuration information about video data in each layer composing encoded video data A, B, and C, respectively.

In the encoded video data A, a layer A1 is a base layer, a reference layer to which a layer A2 (i.e., an enhancement layer) refers is the layer A1, and a reference layer to which a layer A3 (i.e., another enhancement layer) refers is the layer A2.

The number of pixels of the video data in the layer A3 is the largest, that in the layer A2 is next to that in the layer A3, and the number of pixels of the video data in the layer A1 is the smallest.

As illustrated in FIG. 3A, the video data in each layer has the same field of view. Since the number of pixels of the video data in the layer A1 is 960×540 pixels, information about field of view of the video data in the layer A1 is represented by a coordinate system with the upper left and lower right end-point positions of the frame image data composing the video data as (0, 0) and (960, 540), respectively.

At this point, the offset information about the video data in the layer A2 that refers to the video data in the layer A1 represents a difference in the upper left and lower right end-point positions by a coordinate system based on information about field of view of the video data in the layer A1.

As described above, in the encoded video data A, all the video data in each layer are the same in field of view, so that the offset information about the video data in the layer A2 represents a difference in the upper left end-point position as (0, 0) and also in the lower right end-point position as (0, 0). The offset information is stored in the SPS or the slice header corresponding to the layer A2.

The offset information about the video data in the layer A3 represents a difference in the upper left and lower right end-point positions by a coordinate system with the field of view of the video data in the layer A2 as the upper left end-point position (0, 0) and the lower right end-point position (1920, 1080). Therefore, the offset information about the video data in the layer A3 represents a difference in the upper left end-point position as (0, 0) and also in the lower right end-point position as (0, 0).

The offset information about the video data in the layer A2 represents a difference in the upper left end-point position as (0, 0) and in the lower right end-point position as (0, 0), so that it is obvious that the field of view of the video data in the layer A2 is the same as that of the video data in the layer A1, which is the reference layer of the layer A2.

The offset information about the video data in the layer A3 represents a difference in the upper left end-point position as (0, 0) and in the lower right end-point position as (0, 0), so that it is obvious that the field of view of the video data in the layer A3 is the same as that of the video data in the layer A2, which is the reference layer of the layer A3.

Information about the field of view of the video data in the layers A2 and A3 is represented as the upper left end-point position (0, 0) and the lower right end-point position (960, 540) as is the case with the video data in the layer A1 if their respective offset information is converted into a coordinate system with the number of pixels of the video data in the layer A1 as a reference. The configuration information about the video data in each layer composing the video data A including the converted information about field of view is illustrated in FIG. 4A.

In the encoded video data B, a layer B1 is a base layer, a reference layer to which a layer B2 (i.e., an enhancement layer) refers is the layer B1, and a reference layer to which a layer B3 (i.e., another enhancement layer) refers is the layer B2.

The number of pixels of the video data in the layer B3 is the largest, the number of pixels of the video data in the layer B2 is next to that in the layer B3, and the number of pixels of the video data in the layer B1 is the smallest. The video data in the layers B2 and B3 are the same in field of view. The video data in the layer B1 is narrower in field of view than the video data in the layers B2 and B3.

Information about the field of view of the video data in the layers B2 and B3 is represented by a value in which offset information in the layers B2 and B3 is converted into a coordinate system with the number of pixels of the video data in the layer B1 as a reference respectively. The configuration information about the video data in each layer composing the encoded video data B is illustrated in FIG. 4B.

In the encoded video data C, a layer C1 is a base layer, a reference layer to which a layer C2 (an enhancement layer) refers is the layer C1, and a reference layer to which a layer C3 (another enhancement layer) refers is the layer C2.

The number of pixels of the video data in the layers C2 and C3 is the largest, and the number of pixels of the video data in the layer C1 is the smallest.

The video data in the layers C1 and C2 are the same in field of view. The video data in the layer C3 is narrower in field of view than the video data in the layers C1 and C2. Information about the field of view of the video data in the layers C2 and C3 is represented by a value in which offset information in the layers C2 and C3 is converted into a coordinate system with the number of pixels of the video data in the layer C1 as a reference, respectively.

The configuration information about the video data in each layer composing the encoded video data C is illustrated in FIG. 4C.

The processing for determining by the extraction processing determination unit 108 determining an extraction layer in which video data from which frame image data is extracted is encoded is described below. The extraction processing determination unit 108 determines an extraction layer in which video data among a plurality of hierarchically encoded video data from which frame image data is extracted are encoded according to a signal from the signal reception unit 112 which receives a user's instruction for extracting a frame image.

Figure 5:
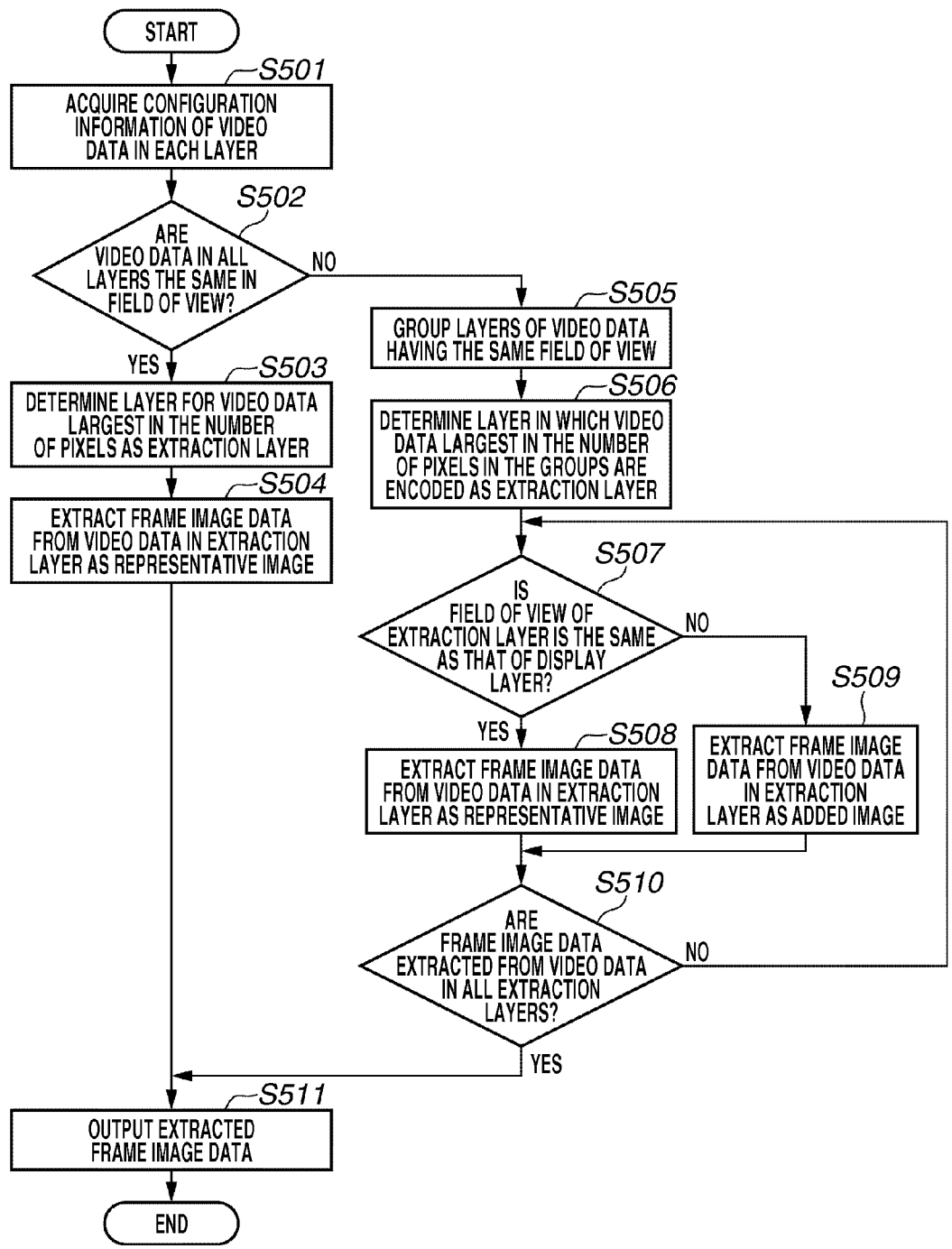
FIG. 5 is a flow chart illustrating control in extracting frame image data according to a first exemplary embodiment of the present invention.

FIG. 5 is a flow chart illustrating control in extracting frame image data according to the first exemplary embodiment.

In step S501, the extraction processing determination unit 108 acquires from the configuration information acquisition unit 105 the configuration information about video data in each layer in which the video data is hierarchically encoded. In step S502, the extraction processing determination unit 108 determines whether video data in all the layers composing video data are the same in field of view based on configuration information acquired from the configuration information acquisition unit 105.

If all the video data are the same in field of view (YES in step S502), the processing proceeds to step S503. If video data different in field of view exists (NO in step S502), the processing proceeds to step S505. More specifically, if three kinds of encoded video data illustrated in FIGS. 3A to 3C are determined in step S502, the encoded video data A is sent to step S503 and the encoded video data B and C are sent to step S505.

In step S503, the extraction processing determination unit 108 determines a layer in which video data composed of frame images largest in the number of pixels is encoded as an extraction layer for extracting frame images. As for the video data A, for example, the layer A3 is the extraction layer.

In step S504, the extraction processing unit 109 extracts frame image data corresponding to the timing at which the user issues an instruction for specifying frame image data to be extracted from video data in the extraction layer, and determines the extracted frame image data as a representative image. The representative image refers to an image for outputting video data from the extraction processing unit 109 to the video synthesis output unit 110.

Frame image data composing decoded video data in the extraction layer is acquired to extract frame image data from video data in the extraction layer. At this point, the frame image data to be acquired is the data having the same time information (time stamp) as the frame image data that is being output to the display panel by the video synthesis output unit 110 at the timing at which the user's instruction for extracting frame image is input.

The present invention, however, does not require that the frame image data having exactly the same time information as the timing at which the user's instruction is input is extracted. This is because the frame image data slightly delayed (e.g., time corresponding to a few frames) from the input timing due to time lag caused by data processing can be extracted.

Therefore, time information determined by the extraction processing determination unit 108 may be slightly different from the timing at which the user's instruction is input as long as the problems of the present invention can be solved.

In step S505, the extraction processing determination unit 108 groups layers of video data having the same field of view. In the encoded video data B, for example, the extraction processing determination unit 108 groups the layers into a group BX of the layer B1 and a group BY of the layers B2 and B3. In the encoded video data C, the extraction processing determination unit 108 groups the layers into a group CX of the layers C1 and C2, and a group CY of the layer C3.

In step S506, the extraction processing determination unit 108 determines a layer in which video data largest in the number of pixels in the groups are encoded as an extraction layer. Based on the above-described example, in the encoded video data B, the layer B1 is taken as the extraction layer in the group BX and the layer B3 is taken as the extraction layer in the group BY. In the encoded video data C, the layer C2 is determined as the extraction layer in the group CX, and the layer C3 is determined as the extraction layer in the group CY.

In step S507, the extraction processing determination unit 108 acquires the configuration information about video data in a display layer at the timing at which the user issues an instruction for extracting frame image from the configuration information acquisition unit 105.

The extraction processing determination unit 108 determines whether the field of view of video data in the display layer is the same as that of the video data in one extraction layer among the extraction layers determined in step S506 using the acquired configuration information about video data in the display layer.

If the field of view of video data in the display layer is the same as that of the video data in one extraction layer (YES in step S507), the processing proceeds to step S508. If not (NO in step S507), the processing proceeds to step S509.

For example, if the display layer in the encoded video data B is the layer B1, in a case where an extraction layer to be determined is the layer B1, which is the extraction layer of the group BX, it is determined that the field of view of video data in the extraction layer is the same as that of video data in the display layer. In a case where an extraction layer to be determined is the layer B3, which is the extraction layer of the group BY, it is determined that the field of view of video data in the extraction layer is different from that of video data in the display layer.

If the display layer is the layer B2 or the layer B3, it is determined that the field of view of video data in the layer B1, which is the extraction layer of the group BX, is different from that of video data in the display layer. It is determined that the field of view of video data in the layer B3, which is the extraction layer of the group BY, is the same as that of video data in the display layer.

As for the encoded video data C, if the display layer is the layers C1 or C2, it is determined that the field of view of video data in the layer C2, which is the extraction layer of the group CX, is the same as that of video data in the display layer.

It is determined that the field of view of video data in the layer C3, which is the extraction layer of the group CY, is different from that of video data in the display layer. If the display layer is the layer C3, it is determined that the field of view of video data in the layer C3, which is the extraction layer of the group CX, is different from that of video data in the display layer. It is determined that the field of view of video data in the layer C3, which is the extraction layer of the group CY, is the same as that of video data in the display layer.

In step S508, the extraction processing unit 109 extracts frame image data from the video data in the extraction layer in the group having the same field of view as video data in the display layer.

For example, if the display layer is the layer B1 in the encoded video data B, the extraction processing unit 109 extracts frame image data corresponding to the timing at which a user's instruction for extracting frame image is input from the video data in the layer B1, which is the extraction layer of the group BX. The extracted frame image data is provided with identification information so that they can be handled as a representative image.

In step S509, the extraction processing unit 109 extracts frame image data from video data in the extraction layer in the group which is different in field of view from the display layer. For example, if the display layer is the layer B1 in the encoded video data B, the extraction processing unit 109 extracts frame image data corresponding to the timing at which the user issues an instruction for extracting frame image data from the video data in the layer B3, which is the extraction layer of the group BY.

The extracted frame image data is provided with identification information so that they can be handled as an image added to the representative image. The added image and the representative image are output from the extraction processing unit 109 to the video synthesis output unit 110 and/or a storage unit.

In step S510, the extraction processing unit 109 determines whether the frame image data is extracted as the added image and the representative image from the video images in all the extraction layers determined in step S506.

If the extraction processing unit 109 determines that the frame image data is extracted from the video images in all the extraction layers (YES in step S510), the processing proceeds to step S511. If the extraction processing unit 109 determines that the frame image data is not yet extracted from the video images in all the extraction layers (NO in step S510), the processing proceeds to step S507.

Although not illustrated in the flow chart in FIG. 5, if the processing proceeds to step S507 from step S510 to execute the process, it is needless to say that an extraction layer not yet determined in step S507 is specified and the specified extraction layer is subjected to the process.

In step S511, the extraction processing unit 109 outputs the frame image data extracted as the representative image in step S508 to the video synthesis output unit 110 according to the identification information provided to the extracted frame image data.

The frame image data extracted as the added image in step S509 is associated with the frame image data extracted as the representative image, and output to and stored in storage media. The representative image is stored with the file path of the added image held in the header of the representative image as attribute information of the representative image, for example. The method for associating the representative image with the added image is not limited to the above one.

The processing for extracting three kinds of encoded video data illustrated in FIGS. 3A to 3C is described above. FIG. 6 illustrates the relationship of the frame image data as the representative image and the added image acquired in a case where the processing in FIG. 5 is applied to the three kinds of encoded video data, with the layers.

In the present exemplary embodiment, the configuration information acquisition unit 105 acquires the configuration information from the SPS or slice header in the encoded video data, however, the configuration information acquisition unit 105 may acquire the configuration information from meta data related to the encoded video data.

In the case of the encoded video data composed to include information about the number of pixels and field of view in section data multiplexed on the MPEG2 TS, for example, those data can be acquired from the section data. In this case, the separation unit 102 separates the section data from the MPEG2 TS, and outputs the section data to the configuration information acquisition unit 105. The configuration information acquisition unit 105 analyzes the input section data to acquire the configuration information.

In the present exemplary embodiment, although the extraction processing unit 109 outputs the extracted representative image to the video synthesis output unit 110, if the extraction processing unit 109 extracts the added image as well as the representative image in the extraction process, the extraction processing unit 109 may inform the user of the images. Furthermore, the extraction processing unit 109 may inquire of the user whether the added image is to be output to the storage media 2.

In the present exemplary embodiment, a case is described where a plurality of video data different in field of view and/or the number of pixels is encoded into the video data stream by the H.264/SVC. However, the present invention is not limited thereto, and the present exemplary embodiment may be applied to a case where a plurality of video data different in field of view and/or the number of pixels is composed of video stream data different from one another and has information about the field of view and the number of pixels of a plurality of video stream data.

According to the present exemplary embodiment, in a case where a plurality of video data different in at least one of field of view and the number of pixels exists and when frame image data is extracted from the video data, the frame image data is extracted from video data which are wider in field of view than the video data that is being displayed and viewed by the user, thereby improving user-friendliness.

Frame image data is extracted from video data which is large in the number of pixels to allow using an image higher in definition when the extracted image data is printed or an enlarged extracted image data is displayed on the display unit, which extends options for the process and print of the image data.

A second exemplary embodiment of the present invention is described below. In the first exemplary embodiment described above, all the representative and the added images are extracted from video data corresponding to the extraction layer and stored in a state of image data.

On the other hand, in the present exemplary embodiment, not all of image data is extracted as the representative and the added images, but information about the field of view of image data with a narrow field of view included in image data with a wide field of view is extracted. The present exemplary embodiment is described below with reference to FIGS. 7 to 9. An image processing apparatus in the second exemplary embodiment is similar in configuration to the image processing apparatus 100 according to the first exemplary embodiment described in FIG. 2, so that the description thereof is omitted.

Description is made below using the encoded video data A, B, and C illustrated in FIG. 3 as a specific example. The field of view, the number of pixels, and information about the reference layer of video data in each layer composing each of the three kinds of the encoded video data A, B, and C are similar to those in FIG. 4.

Figure 7:
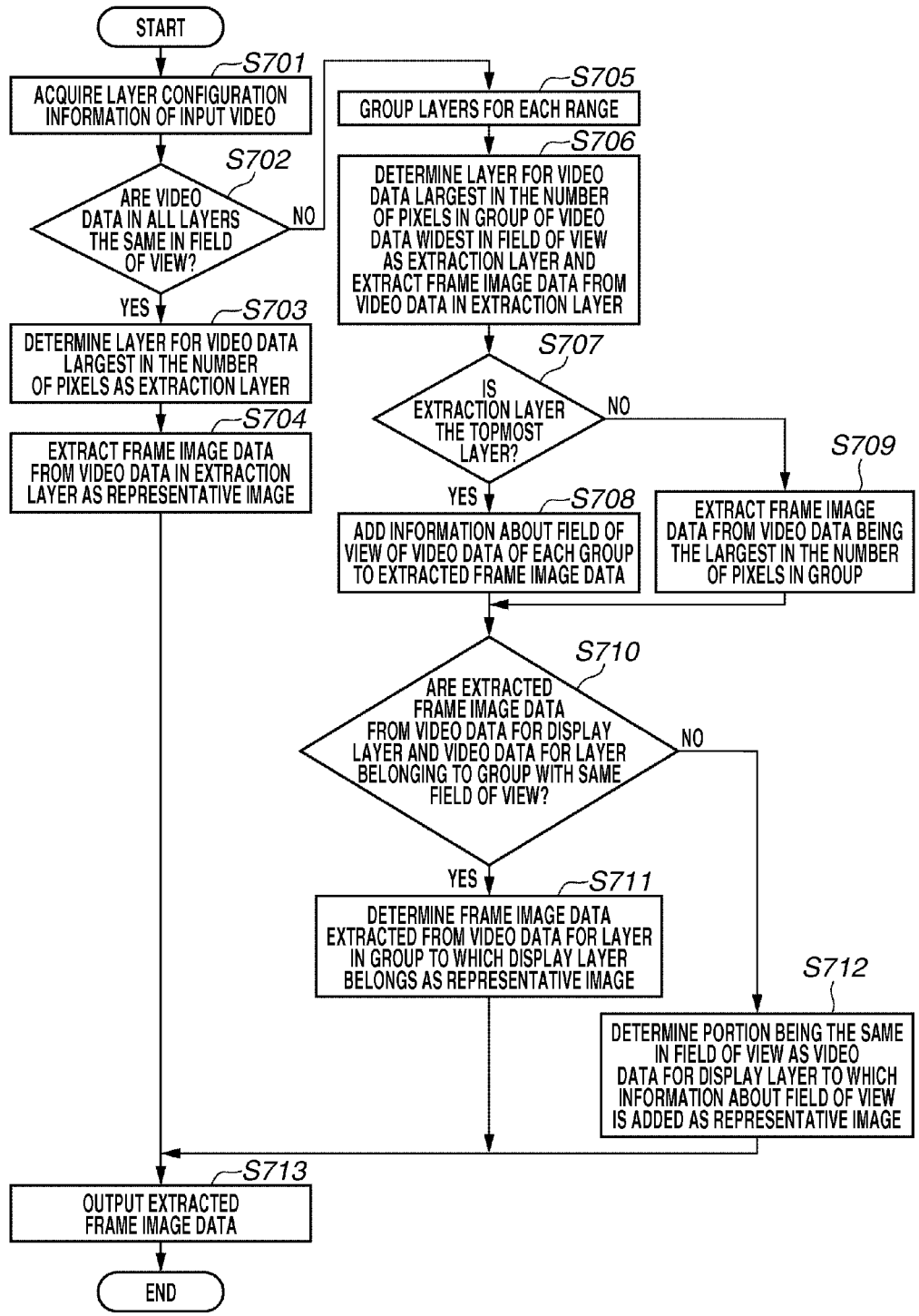
FIG. 7 is a flow chart illustrating control in extracting frame image data according to a second exemplary embodiment of the present invention.

FIG. 7 is a flow chart illustrating control in extracting frame image data according to a second exemplary embodiment. Steps S701 to S705 are similar in control to steps S501 to S505 of the flowchart illustrated in FIG. 5 in the above first exemplary embodiment, so that the description thereof is omitted.

In step S706, the extraction processing determination unit 108 determines a layer in which video data largest in the number of pixels in the group widest in field of view in the group grouped in step S705 is encoded as an extraction layer. The extraction processing unit 109 extracts frame image data from video data in the extraction layer.

For example, with the layer B3 in the group BY widest in field of view as an extraction layer in the encoded video data B and with the layer C2 in the group CX widest in field of view as an extraction layer in the encoded video data C, frame image data is extracted from video data in each layer.

As is the case with steps S508 or S509, the frame image data corresponding to the timing at which the user issues an instruction for extracting frame image is extracted from the video data in the extraction layer.

In step S707, the extraction processing determination unit 108 determines whether the extraction layer determined in step S706 is the topmost layer in all the layers composing the encoded video data. If the extraction layer is the topmost layer in the encoded video data (YES in step S707), the processing proceeds to step S708. If the extraction layer is not the topmost layer (NO in step S707), the processing proceeds to step S709.

Whether the extraction layer is the topmost layer depends on whether there is a reference layer that refers to the layer. For the encoded video data B, for example, the layer B3 that is the extraction layer in step S706 is the topmost layer in the encoded video data B, so that the processing proceeds to step S708.

For the encoded video data C, on the other hand, the layer C2 is the extraction layer in step S706, however, the layer C2 is not the topmost layer in the encoded video data C, so that the processing proceeds to step S709.

In step S708, the extraction processing unit 109 adds information about field of view of video data belonging to a group except the group to which the extraction layer determined in step S706 belongs, to the frame image data extracted in step S706 as meta data.

For the encoded video data B, for example, information about field of view of video data in the layer B1 belonging to the group BX is added to the frame image data extracted from the video data in the layer B3. For the encoded video data C, information about field of view of video data in the layer C3 belonging to the group CY is added to the frame image data extracted from the video data in the layer C2.

Information about field of view is added to the extracted image data in such a manner that a management table for image data, for example, is provided, the information about field of view is associated with the extracted image data and written therein. Alternatively, the information about field of view to be added is added to the header of the extracted image data. A method for adding the information about field of view to the image data is not limited to the above one.

At this point, the information about field of view of video data added to the frame image data is the one that is converted into a coordinate system by using the number of pixels of video data in the extraction layer in step S707 as reference. More specifically, let us discuss the case where the information about field of view of video data in the layer B1 belonging to the group BX is added to the frame image data extracted from the video data in the layer B3.

The information about field of view added to the frame image data is the one in which the information about field of view of video data in the layer B1 is converted into a coordinate system based on the number of pixels of the video data from which the frame image data is extracted.

FIG. 8 is a schematic diagram illustrating the information about field of view of video data in the layer B1 converted into the coordinate system based on the number of pixels of the video data in the layer B3.

As illustrated in FIG. 4B, since the number of pixels of the video data in the layer B3 is 3840×2160 pixels, the field of view of the video data in the layer B3 can be represented by a coordinate system of the upper left end-point position (0, 0) and the lower right end-point position (3840, 2160). The upper left end-point position (0, 0) and the lower right end-point position (960, 540), which are the information about field of view of video data in the layer B1, are converted into the coordinate system based on the number of pixels of the video data in the layer B3.

In the coordinate system, the information about field of view of video data in the layer B1 is represented by the upper left end-point position (960, 540) and the lower right end-point position (2880, 1620). The converted information about field of view of video data in the layer B1 is added to the frame image data extracted from the video data in the layer B3.

In step S709, the extraction processing determination unit 108 determines the layer in which the video data largest in the number of pixels in each group except the group widest in field of view is encoded as an extraction layer, and the extraction processing unit 109 extracts frame image data from the video data in the extraction layer.

In the encoded video data C, for example, the layer C3 in which the video data that is largest in the number of pixels in the group CY is encoded is determined as an extraction layer, and frame image data is extracted from the video data in the layer C3.

In step S710, the extraction processing determination unit 108 refers to the configuration information about the video data in the display layer determined by the display layer determination unit 106 to determine which group the display layer belongs to. The extraction processing determination unit 108 determines whether frame image data is extracted from the video data in the layer belonging to the group that is the same in field of view as the video data in the display layer by the process in steps S706 or S709.

If frame image data is extracted from the video data in the layer belonging to the group that is the same in field of view as the video data in the display layer (YES in step S710), the processing proceeds to step S711. If frame image data is not extracted (NO in step S710), the processing proceeds to step S712.

If frame image data is not extracted from the video data in the layer belonging to the group that is the same in field of view as the video data in the display layer, information about the field of view that is the same as that of the video data in the display layer is provided for the frame image data extracted by the process in step S706.

For the encoded video data B, for example, if the layer B1 is the display layer, frame image data is not extracted from the video data in the layer belonging to the group BX that is the same in field of view as the video data in the display layer B1 that is the display layer (NO in step S710), so that the processing proceeds to step S712.

If the layer B2 or the layer B3 is the display layer, frame image data is extracted in the process of step S706 from the video data in the layer belonging to the group BY that is the same in field of view as the video data in the display layers B2 or B3 (YES in step S710), so that the processing proceeds to step S711.

For the encoded video data C, frame image data is extracted from the video data in the layer C2 belonging to the group CX in the process of step S706, and from the video data in the layer C3 belonging to the group CY in the process of step S709.

Even if the display layer is any of the layers C1 to C3, frame image data is extracted from video data in the layer belonging to the group that is the same in field of view as the video data in the display layer, so that the processing proceeds to step S711.

In step S711, the extraction processing determination unit 108 determines the frame image data extracted from the video data in the layer of the group to which the display layer belongs as a representative image, and provides the frame image data with identification information so that the other extracted frame image data can be handled as an added image.

In step S712, the extraction processing determination unit 108 provides the frame image data extracted in step S706 with identification information so that the portion indicated by information about field of view of video data of the group to which the display layer belongs can be handled as a representative image.

In step S713, the extraction processing unit 109 outputs the frame image data extracted as a representative image to the video synthesis output unit 110 according to the identification information provided to the extracted frame image data. The frame image data extracted as an added image is associated with the frame image data extracted as a representative image, and stored in a storage medium.

The representative image is stored with the file path of the added image held in the header of the representative image as attribute information of the representative image, for example. The method for associating the representative image with the added image is not limited to the above one. The frame image data, to which image information extracted as a representative image is added, is output to and stored in a storage medium.

FIG. 9 illustrates layers of the encoded video data in which the representative image is extracted from the encoded video data A, B, and C by the above extraction process, groups in which information about field of view is added to the extracted frame image data, and layers of video data from which an added image is extracted.

If the display layer is the layer B1 in the encoded video data B, a representative image is an image in an area where the frame image data extracted from the video data in the layer B3 is clipped based on information about field of view of video data of the group BX to which the display layer belongs.

Thus, the image data that is the same in field of view as the displayed video image can be presented to the user with the frame image data extracted from video data that is the same in field of view as the displayed video data or image data in an area clipped based on information about field of view provided to the extracted frame image data and is the same as that of the displayed video data as a representative image.

In the present exemplary embodiment, the frame image data is extracted from video data largest in field of view in a plurality of video data in extracting the frame image data from the plurality of video data. The user can acquire the frame image data extracted from the video data larger in field of view than the video data being displayed, and therefore user-friendliness can be improved.

Information about field of view of other video data different from information about field of view of video data from which the frame image data is extracted is added to the frame image data extracted from video data largest in field of view in a plurality of video data, thereby allowing the reduction of the data capacity of the frame image data to be extracted.

A third exemplary embodiment according to the present invention is described below. In the above first and second exemplary embodiments, there is described the control for extracting a representative image and an added image or information about field of view of image data with a narrow field of view included in the representative image.

Figure 10:
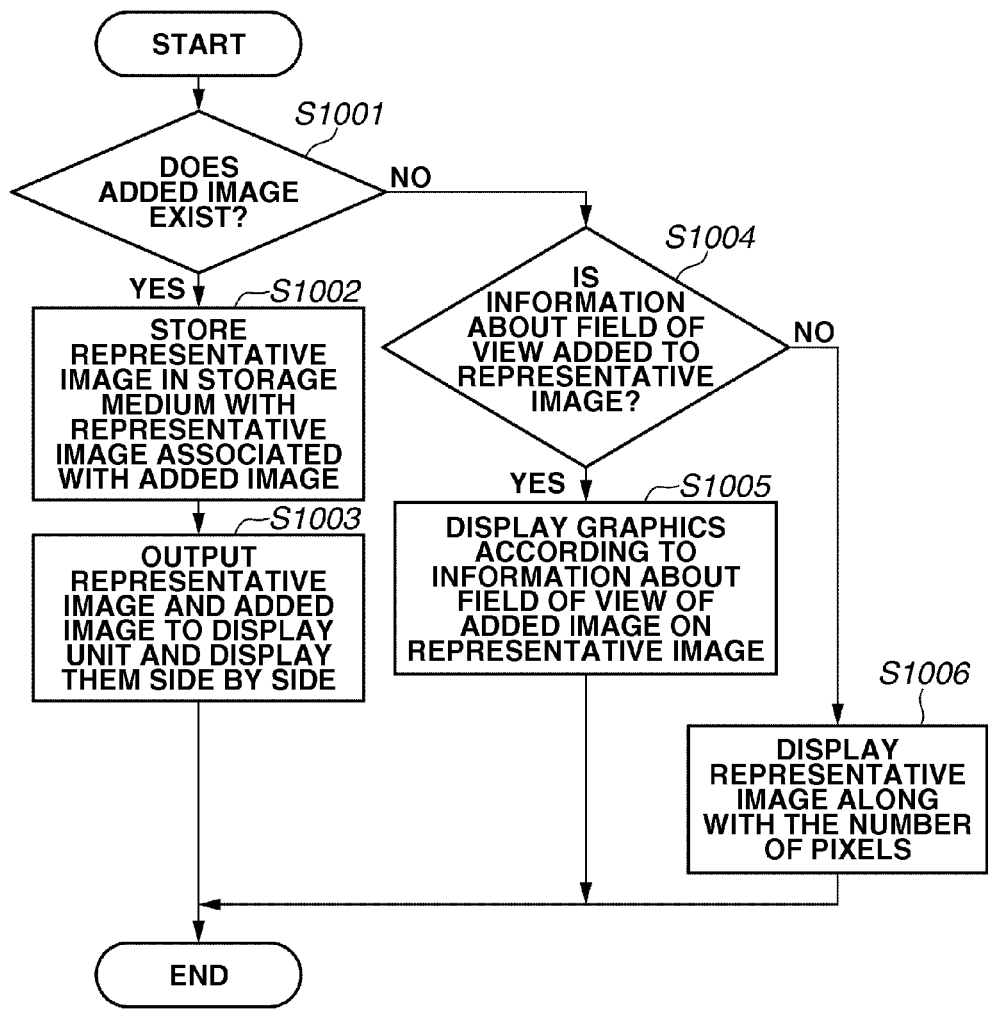
FIG. 10 is a flow chart illustrating a process after information about field of view of frame image data and/or video data is extracted according to a third exemplary embodiment of the present invention.

In the present exemplary embodiment, processes after extraction are described with reference to the flow chart illustrated in FIG. 10. The processes illustrated in FIG. 10 correspond to those in step S511 in FIG. 5 and step S713 in FIG. 7.

An image processing apparatus in the third exemplary embodiment is similar in configuration to the image processing apparatus 100 illustrated in FIG. 2, so that the description thereof is omitted. Description is made below using the encoded video data A, B, and C illustrated in FIG. 3 as a specific example. The field of view, the number of pixels, and information about the reference layer of video data in each layer composing each of the above encoded video data A, B, and C are similar to those in FIG. 4.

In step S1001, the extraction processing unit 109 extracts the frame image data, and then determines whether an added image exists in the extracted frame image data. If there are a plurality of frame image data and an image added to a representative image (YES in step S1001), the processing proceeds to step S1002. If there is only a representative image in the extracted frame image data, but there is no added image (NO in step S1001), the processing proceeds to step S1004.

In step S1002, the extraction processing unit 109 stores the representative image that is associated with the added image in the storage medium 2. The representative image is stored as attribute information of the representative image, for example, with the file path of the added image held in the header of the representative image.

Figure 11A:
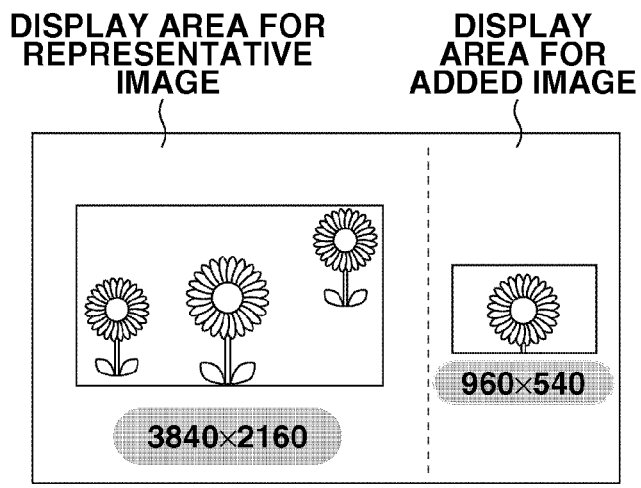
FIG. 11A is a schematic diagram illustrating an example of image data displayed in step S1003 in FIG. 10 according to the third exemplary embodiment of the present invention.

In step S1003, the extraction processing unit 109 outputs the representative image and the added image to the video synthesis output unit 110. The video synthesis output unit 110 synthesizes the representative image and the added image with graphics data output from the control unit 111, and outputs them to the display panel. An example displayed on the display panel in this case is illustrated in FIG. 11A. The representative image is displayed in a representative image display area. The added image is displayed in an added-image display area. Layout is not limited to FIG. 11A.

The number of pixels of the representative image and the added image in addition to the image data may be displayed. In a case where the representative image and the added image are displayed side by side, the ratio of size of the display image is desirably matched to that of size of actual representative and added images so that difference in the number of pixels and field of view can be recognized at a glance.

In step s1004, the extraction processing unit 109 determines whether information about field of view is added to the representative image. For example, information about field of view is added to the header of the representative image or associated with the representative image on the management table of image data.

If information about field of view is added to the representative image (YES in step S1004), the processing proceeds to step S1005. If not (NO in step S1004), the processing proceeds to step S1006.

In step S1005, the video synthesis output unit 110 synthesizes the representative image output from the extraction processing unit 109 with the graphics data output from the control unit 111 to the display panel and displays them thereon. At this point, the control unit 111 generates a frame image corresponding to image information added to the representative image and superimposes the generated frame image on the representative image.

Figure 11B:
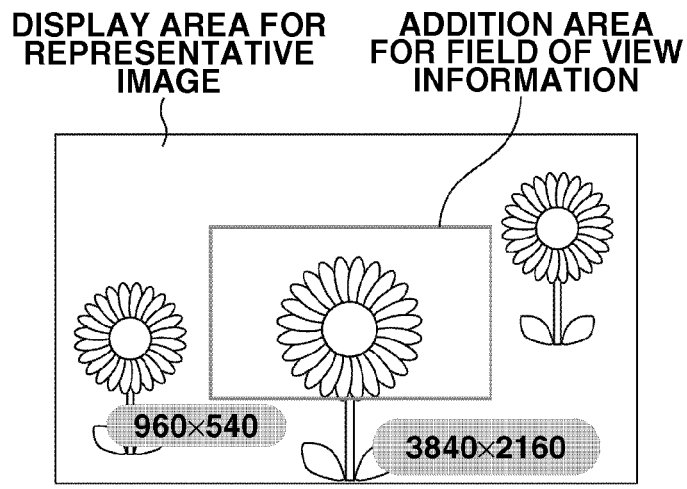
FIG. 11B is a schematic diagram illustrating an example of image data displayed in step S1005 in FIG. 10 according to the third exemplary embodiment of the present invention.

An example displayed on the display panel in this case is illustrated in FIG. 11B. The frame image generated from the information about field of view of the image added as the attribute information of the representative image is superimposed on the representative image displayed on the representative image display area. This is done so that the user can easily understand that the field of view of the added image corresponds to the illustrated position with respect to the field of view of the representative image.

If the user desires such output process as the storage or the print of image data, it is desirable that the user performs an operation input for outputting an area included in a frame image to cause the control unit 111 to trim the area included in a frame image from a representative image to execute the process for generating a new image data.

Figure 11C:
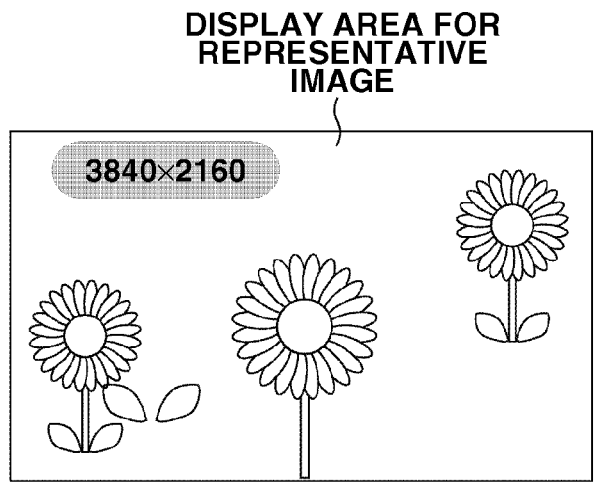
FIG. 11C is a schematic diagram illustrating an example of image data displayed in step S1006 in FIG. 10 according to the third exemplary embodiment of the present invention.

In step S1006, there is performed a display process in a case where neither an added image nor information about field of view corresponding to the added image does not exist. The video synthesis output unit 110 superimposes graphics data indicating the number of pixels of the representative image output from the control unit 111 on the representative image output from the extraction processing unit 109, and outputs the superimposed image to the display panel. An example displayed on the display panel in this case is illustrated in FIG. 11C.

According to the present exemplary embodiment, if frame image data are extracted from a plurality of video data, the user can easily know that the frame image data with what field of view and what number of pixels are extracted.

This allows reducing user confusion if frame image data is extracted from the video data different in field of view and the number of pixels from the video data displayed by the user.

The field of view of a plurality of video data is superimposed on the extracted frame image data as a frame image to allow the user to visually recognize the field of view of a plurality of video data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-049316 filed Mar. 5, 2010, which is hereby incorporated by reference herein in its entirety.

What is claimed is:

1. An image processing apparatus capable of reproducing encoded video data in which a plurality of video data is hierarchically encoded, wherein the encoded video data in which a plurality of video data is hierarchically encoded has a structure for holding encoded stream data in a plurality of layers corresponding to a plurality of video data, the encoded stream data in each layer includes information about the number of pixels indicating a value of the number of pixels of frame image data composing video data corresponding to each layer, information about field of view of the video data, and information about a reference layer to which reference is made in encoding the video data and which is related to a layer corresponding to video data, video data low in resolution of frame image data composing video data in a plurality of video data is encoded in a lower layer, and video data high in resolution of frame image data composing video data is encoded in a higher layer, the image processing apparatus comprising:

an output unit configured to output video data and image data to a display unit;

an acquisition unit configured to acquire the information about the number of pixels and field of view of the video data and the information about a reference layer from the encoded stream data in each layer;

a determination unit configured to determine whether information about field of view of the video data corresponding to each layer is the same as information about field of view of display video data of video displayed on the display unit at a timing according to instruction input for specifying frame image data to be extracted from video data on the basis of the information about the number of pixels and field of view and the information about the reference layer acquired by the acquisition unit; and an extraction unit configured to extract frame image data corresponding to the timing from video data of a layer higher than a layer corresponding to the display video data, among the video data which is determined by the determination unit to be associated with the same information about field of view as the information about field of view of the display video data by the determination unit, if (i) the information about field of view of the video data corresponding to each layer is determined by the determination unit to be the same as the information about field of view of the display video data, and (ii) the video data of the layer higher than the layer corresponding to the display video data exists, and extract frame image data corresponding to the timing from the display video data, if (i) the information about field of view of the video data corresponding to each layer is determined by the determination unit to be the same as the information about field of view of the display video data, and (iii) the video data of the layer higher than the layer corresponding to the display video data does not exist, wherein the output unit outputs the frame image data corresponding to the timing and extracted by the extraction unit, to the display unit.

2. The image processing apparatus according to claim 1, wherein the extraction unit extracts the frame image data corresponding to the timing from the video data associated with information about the number of pixels being the largest in value of the number of pixels among the video data associated with the same information about field of view out of the video data associated with the information about field of view different from the display video data.

3. The image processing apparatus according to claim 1, wherein the plurality of image data is MPEG2 transport stream format stream-data.

4. The image processing apparatus according to claim 1, wherein the encoded video data is hierarchically encoded by H.264/SVC standard.

5. The image processing apparatus according to claim 1, wherein the plurality of video data is video data generated from same video data.

6. The image processing apparatus according to claim 1, wherein the image processing apparatus includes the display unit.

7. The image processing apparatus according to claim 1, wherein the encoded video data is encoded video data in which three kinds of video data corresponding to three layers are hierarchically encoded.

8. A method for controlling an image processing apparatus capable of reproducing encoded video data in which a plurality of video data is hierarchically encoded, wherein the encoded video data in which a plurality of video data is hierarchically encoded has a structure for holding encoded stream data in a plurality of layers corresponding to a plurality of video data, the encoded stream data in each layer includes information about the number of pixels indicating a value of the number of pixels of frame image data composing video data corresponding to each layer, information about field of view of the video data, and information about a reference layer to which reference is made in encoding the video data and which is related to a layer corresponding to video data, video data low in resolution of frame image data composing video data in a plurality of video data is encoded in a lower layer and video data high in resolution of frame image data composing video data is encoded in a higher layer, the method comprising:

outputting video data and image data to a display unit;

acquiring the information about the number of pixels and field of view of the video data and the information about a reference layer from the encoded stream data in each layer;

determining whether information about field of view of the video data corresponding to each layer is the same as information about field of view of display video data of video displayed on the display unit at a timing according to an instruction input for specifying frame image data to be extracted from video data on the basis of the information about the number of pixels and field of view and the acquired information about the reference layer; and extracting frame image data corresponding to the timing from video data of a layer higher than a layer corresponding to the display video data, among the video data which is determined to be associated with the same information about field of view as the information about field of view of the display video data, if (i) the information about field of view of the video data corresponding to each layer is determined to be the same as the information about field of view of the display video data, and (ii) the video data of the layer higher than the layer corresponding to the display video data exists, and extract frame image data corresponding to the timing from the display video data, if (i) the information about field of view of the video data corresponding to each layer is determined to be the same as the information about field of view of the display video data, and (iii) the video data of the layer higher than the layer corresponding to the display video data does not exist, wherein the outputting outputs the frame image data corresponding to the timing and extracted, to the display unit.

9. The method according to claim 8, wherein the frame image data corresponding to the timing from the video data associated with information about the number of pixels being the largest in value of the number of pixels among the video data associated with the same information about field of view out of the video data associated with the information about field of view different from the display video data is extracted.

10. The image processing apparatus according to claim 8, wherein the plurality of image data is MPEG2 transport stream format stream-data.

11. The image processing apparatus according to claim 8, wherein the encoded video data is hierarchically encoded by H.264/SVC standard.

12. The image processing apparatus according to claim 8, wherein the plurality of video data is video data generated from same video data.

13. The image processing apparatus according to claim 8, wherein the image processing apparatus includes the display unit.

14. The image processing apparatus according to claim 8, wherein the encoded video data is encoded video data in which three kinds of video data corresponding to three layers are hierarchically encoded.

* * * * *